United States Patent
Kubota et al.

(10) Patent No.: US 7,041,325 B2
(45) Date of Patent: *May 9, 2006

(54) FOOD ADDITIVE SLURRY COMPOSITIONS AND POWDER COMPOSITIONS AND FOOD COMPOSITIONS CONTAINING THE SAME

(75) Inventors: Naoki Kubota, Hyogo (JP); Hisakazu Hojo, Hyogo (JP)

(73) Assignee: Maruo Calcium Company Limited, Akashi (JP)

( * ) Notice: Subject to any disclaimer, the term of this patent is extended or adjusted under 35 U.S.C. 154(b) by 296 days.

This patent is subject to a terminal disclaimer.

(21) Appl. No.: 10/148,894

(22) PCT Filed: Dec. 20, 2000

(86) PCT No.: PCT/JP00/09067

§ 371 (c)(1),
(2), (4) Date: Jun. 18, 2002

(87) PCT Pub. No.: WO01/47376

PCT Pub. Date: Jul. 5, 2001

(65) Prior Publication Data

US 2003/0134008 A1    Jul. 17, 2003

(30) Foreign Application Priority Data

Dec. 24, 1999 (JP) ................................. 11-367210

(51) Int. Cl.
*A23L 1/0522* (2006.01)
*A23L 1/0528* (2006.01)
*A23L 1/304* (2006.01)

(52) U.S. Cl. ........................ 426/74; 426/506; 426/518; 426/573; 426/648

(58) Field of Classification Search ................ 426/74, 426/506, 518, 573, 648
See application file for complete search history.

(56) References Cited

U.S. PATENT DOCUMENTS

| 4,670,268 A | * | 6/1987 | Mahmoud | ..................... 426/72 |
| 5,609,898 A | | 3/1997 | Kaji et al. | ..................... 426/74 |
| 6,254,905 B1 | * | 7/2001 | Hojo et al. | ................... 426/74 |

FOREIGN PATENT DOCUMENTS

| JP | 61-242562 | 10/1986 |
| JP | 63-107937 | 5/1988 |

OTHER PUBLICATIONS

Search Report dated Feb. 13, 2001.

* cited by examiner

*Primary Examiner*—Helen Pratt
(74) *Attorney, Agent, or Firm*—Armstrong, Kratz, Quintos, Hanson & Brooks, LLP

(57) ABSTRACT

A food additive slurry or powder composition is disclosed which comprises 100 parts by weight of at least one selected from the group consisting of calcium carbonate, calcium phosphate and dolomite (A) and 0.5 to 60 parts by weight of arabinogalactan (B). The food additive slurry composition of the present invention is highly concentrated and excellent in dispersion stability in liquid, which can be effectively utilized for the enrichment of calcium and/or magnesium by adding to foods such as yogurt, cow's milk, juice, milk powder, instant noodles and biscuits.

10 Claims, No Drawings

FOOD ADDITIVE SLURRY COMPOSITIONS AND POWDER COMPOSITIONS AND FOOD COMPOSITIONS CONTAINING THE SAME

TECHNICAL FIELD

The present invention relates to a food additive slurry composition and food additive powder composition having a high concentration and excellent dispersion stability in liquid, which is effectively utilized by adding to foods such as yogurt, cow's milk, juice and milk powder, instant noodles, biscuits, etc., to enrich calcium and/or magnesium, and a food composition containing the food additive slurry or powder composition.

BACKGROUND ART

Recently, the shortage of ingestion of calcium is often pointed out and this phenomenon is notable in growing children and aged persons. In order to solve the shortage of calcium ingestion, calcium-enriched foods have come to be sold. Even in cow's milk which is generally said to have a high content of calcium, it has been attempted to sell a calcium-enriched cow's milk by further adding calcium. Further, other calcium-enriched products such as juice and milk powder, instant noodles, biscuits, etc., are started to be sold.

For example, in cow's milk and yogurt, a water-soluble inorganic acid form or organic acid form calcium such as calcium lactate and calcium chloride, a water-difficultly soluble inorganic form calcium such as calcium carbonate and calcium phosphate are used.

However, the water-soluble inorganic acid form or organic acid form calcium are liable to damage the stability of proteins contained in cow's milk and yogurt and thus they have a disadvantage that it is difficult to add more than a given level to thus prevent a large amount of use as materials of calcium.

On the other hand, the water-insoluble calcium in an inorganic form does not damage the stability of proteins contained in cow's milk and yogurt due to water-insolubility and thus it can be used in a large amount. The calcium in an inorganic form generally has, however, a high specific gravity of 2.7 or more and thus when said calcium is dispersed in cow's milk, it precipitates in a short time to undesirably lower the beauty in appearance. As a result, it has a disadvantage that it can not be used in a large amount.

Many methods for adding a large amount of calcium to foods have been heretofore proposed. For example, as a method for preparing a slurry of a calcium agent in an inorganic form, Japanese Patent Non-examined publication (Kokai) No. 64-69513 proposes a method for improving dispersibility of calcium carbonate by irradiating supersonic wave to a calcium carbonate slurry which was not subjected to drying and pulverization in the production step or to a mixture of the calcium carbonate slurry and a hydrophilic emulsifier with an HLB of not less than 10.

In Example 2 of this publication, a preparation method of a calcium agent slurry having approximately 8% by weight of a solid content of calcium carbonate by irradiating supersonic wave to a mixture of a 10% by weight of calcium carbonate slurry and an aqueous solution of approximately 6% by weight of sucrose fatty acid ester of the HLB 15.

However, with such a low concentrated calcium carbonate of 8% by weight or so obtained by this method, though a calcium agent having a good dispersibility can be obtained, it is difficult to prepare a calcium agent slurry having an average particle size of less than 0.3 μm which is excellent in dispersibility and applicable to foods being stored for a long period of time such as long-life cow's milk, and even when prepared, energy cost required for dispersion unavoidably increases. Moreover, not only an increase in energy cost, but circulation costs such as containers of the calcium agent slurry, cold storage equipment, cold storage, and transportation increase and thus it is not a preferable method.

Further, Japanese Patent Non-examined Publication (Kokai) No. 6-127909 discloses a method for preparing a calcium phosphate dispersion by wet-pulverizing a mixture of a sucrose stearic acid ester with the HLB 16 and calcium phosphate under the specific conditions, and Japanese Patent Non-examined Publication (Kokai) No. 6-127939 discloses a method for preparing a calcium carbonate dispersion by wet-pulverizing a mixture of a sucrose stearic acid ester with the HLB 16 and calcium carbonate in the similar manner.

According to these methods, though it is possible to prepare a calcium agent slurry of an average particle size of less than 0.3 μm having a good dispersibility, the solid concentration of a calcium agent slurry proposed is only approximately 10% by weight at highest, and are also included the problems associated with equipment cost and circulation cost, as in the case of the method proposed by the above-mentioned Japanese Patent Non-examined Publication (Kokai) No. 64-69513.

Moreover, Japanese Patent Non-examined Publication (Kokai) No. 9-9919 proposes a method for improving dispersibility by adding to calcium carbonate at least one selected from the group consisting of phospholipid and protein decomposition products, followed by wet-pulverizing. However, the product obtained by this method includes the problems in flavor such as odor and bitterness. Moreover, according to this publication, since the calcium dispersion liquid obtained contains calcium carbonate of an average particle size of 1 to 3 μm, a cow's milk added with calcium obtained by this method is poor in recovery of calcium carbonate in a centrifugal separator such as a clarifier used in the production step, the precipitation tends to take place in foods such as cow's milk and thus it is not suited for foods being stored for a long period of time such as long-life cow's milk.

Furthermore, Japanese Patent Non-examined Publication (Kokai) No. 6-197736 proposes a method for preparing a dried powder by drying by the use of a drying machine such as a spray dryer a calcium agent slurry comprising a mixture of a sucrose stearic acid ester with the HLB 16 and calcium phosphate or calcium carbonate. However, the solid concentration of a calcium agent of a calcium agent slurry as the material to be dried is as low as approximately 10% by weight and thus there are also included the problems to be improved from the viewpoint of a drying energy cost and an investment cost in a drying equipment.

Moreover, WO 98-42210 proposes a highly concentrated food additive slurry composition and/or powder composition which comprises mixing at least one selected from calcium carbonate, calcium phosphate and ferric pyrophosphate, and gum arabic, and further a food composition containing the same. However, the gum arabic used in this method is a natural product and thus its cost had extremely increased, in the past, due to the reduced production caused by a natural disaster. In addition, since it is an imported product, it is often difficult to obtain by an influence of the world situation. Accordingly, there was a problem in respect of a stable supply of cheap products.

In recent years, with a development of containers being stored for a long period of time for cow's milk, yogurt, juice or the like and a storage method therefor, cases where those foods are stored for a long period of time in shops, automatic vending machines, large-size domestic iceboxes or the like are increasing. In such cases, when calcium carbonate particles added for the calcium-enrichment of those foods are not good in dispersibility in the foods, they precipitate at the bottom of the container during the storage for a long period of time, which often gives unpleasant and unclean feel and impression to drinkers who take liquid foods such as cow's milk and juice.

Accordingly, in liquid foods added with inorganic particles such as calcium carbonate prepared at present for the calcium-enrichment and put on the market, since the period of dispersion stability in foods is short, the amount of the inorganic particles added have to be limited to an extremely small amount. Otherwise, the use of the inorganic particles has to be limited to such liquid foods as taken within 1 to 2 days after being purchased by consumers.

Further, in the recent noodles industry, especially instant noodles industry, a variety of products added with various minerals and vitamins are developed from the need of differentiation, gastronome (gourmet) tendency and the like. Though calcium carbonate added to enrich calcium has to be dispersed uniformly in the noodles, if dispersibility and fluidity of the calcium are not sufficient, the calcium content in the noodles becomes uneven and that is not suited for a calcium-enriched food. Moreover, in order to solve the above problem, it is necessary to stir materials of noodles and calcium carbonate for a long time or vigorously to mix them uniformly and this is also undesirable from the viewpoint of energy cost.

Furthermore, in recent years the activity of magnesium in a living body is drawing attention. Magnesium is closely related with metabolism of calcium, and its shortage causes various symptoms due to dysbolism. Further, magnesium is related to various enzymatic reactions, and is said to maintain the homeostasis in the body. However, since the majority of magnesium is lost in the food refining process, it tends to be lacking in the eating life of the present days, and therefore, magnesium-enriched food is attracting attention lately.

For example, in soft drinks a water-soluble magnesium such as magnesium chloride and magnesium sulfate, and a water-insoluble or water-difficultly soluble inorganic form magnesium such as magnesium oxide are added for the purpose of enriching magnesium. However, the water-soluble organic or inorganic form magnesium is strong in bitterness and thus it can not be denied that its amount added is limited in respect of taste. Moreover, when the water-insoluble or water-difficultly soluble inorganic form magnesium such as magnesium oxide is used, it has a specific gravity as high as 3.0 or more. Accordingly, if it is dispersed in, for example, soft drinks, it precipitates in a short time to undesirably lower the eating impression and the beauty in appearance. As a result, it has a disadvantage that it can not be used in a large amount, as in the water-soluble magnesium.

In light of the foregoing situation, the present invention is to provide a food additive slurry composition or powder composition having a high concentration which enhances circulation economy and having a high dispersibility which is suitable as an additive for foods such as cow's milk and instant noodles, and a food composition containing the same.

DISCLOSURE OF THE INVENTION

The present invention encompasses, in a first aspect, a food additive slurry composition which contains 100 parts by weight of at least one selected from the group consisting of calcium carbonate and calcium phosphate (hereinafter referred to as a calcium agent), and dolomite (A) and 0.5 to 60 parts by weight of arabinogalactan (B).

The present invention encompasses, in a second aspect, a food additive slurry composition which contains 100 parts by weight of at least one selected from the group consisting of a calcium agent and dolomite, and 0.1 to 80 parts by weight of a modified starch (C).

The present invention encompasses, in a third aspect, a food additive slurry composition which contains at least one selected from the group consisting of a calcium agent and dolomite (A), arabinogalactan (B) and a modified starch (C), in which the arabinogalactan (B) is 0.5 to 60 parts by weight and the modified starch (C) is 0.1 to 80 parts by weight per 100 parts by weight of at least one selected from the group consisting of a calcium agent and dolomite (A), and the total amount of the arabinogalactan (B) and the modified starch (C) is 1 to 100 parts by weight per 100 parts by weight of at least one selected from the group consisting of a calcium agent and dolomite (A).

The present invention encompasses, in a fourth aspect, a food additive powder composition, wherein the above-described food additive slurry composition is dried and pulverized.

The present invention encompasses, in a fifth aspect, a food composition containing the above-described food additive slurry composition and/or food additive powder composition.

BEST MODES FOR CARRYING OUT THE INVENTION

The calcium carbonate usable in the present invention may include, for example, coral calcium carbonate containing calcium carbonate of 50% by weight or more, heavy calcium carbonate and synthetic calcium carbonate. Among these, the synthetic calcium carbonate prepared by chemical synthetic processes represented by a carbon dioxide process in which milk of lime being an aqueous suspension of calcium hydroxide is reacted with carbon dioxide gas is preferable, since a fine dispersion is easy to be obtained.

As a preferable method for preparing a synthetic calcium carbonate by the carbon dioxide process, the following method is exemplified:

That is, the carbonation reaction is conducted between lime of milk and carbon dioxide gas and an aqueous suspension of the calcium carbonate is obtained. In this case, calcium carbonate is prepared by stirring and/or wet-pulverizing and/or still standing an aqueous suspension of the pH Q containing calcium carbonate after completion of the carbonation reaction to thus raise the pH of the aqueous suspension to the pH R satisfying the equations (a) and (b), thereafter, adjusting the pH of the aqueous suspension to the pH S satisfying the equation (c) by removing alkali substances or lowering the concentration per volume of alkali substances:

$$R \geq 8.6 \tag{a}$$

$$10^{(R+2)}/10^Q \geq 125 \tag{b}$$

$$10^{(S+2)}/10^R \leq 80 \tag{c}$$

wherein Q and R mean a pH under the same temperature, respectively. With respect to the pH S, when S is less than 8.6, calculation is made as 8.6.

The calcium phosphate usable in the present invention stands for inorganic substances comprising calcium salts of phosphoric acid, and may include natural calcium phosphates containing calcium phosphate of 50% by weight or more, cow's born and synthetic calcium phosphate. Among these, synthetic calcium phosphate prepared by a chemical synthetic process in which a calcium salt such as calcium hydroxide, calcium carbonate and calcium chloride and a phosphoric acid compound such as phosphoric acid and a phosphoric acid salt such as sodium phosphate are allowed to be reacted is preferable. Among these synthetic calcium phosphates, at least one calcium phosphate selected from calcium dihydrogenpyrophosphate, calcium monohydrogenphosphate and calcium tertiary phosphate is more preferable.

As to the form of calcium carbonate and/or calcium phosphate (hereinafter referred to as "calcium agent") used as materials in the present invention, an aqueous suspension of the calcium agent prepared by a normal method or an aqueous suspension obtained by adding water to the calcium agent in the form of powder prepared by dehydrating, drying and pulverizing the foregoing aqueous suspension of the calcium agent may suffice, but the latter form is preferable from the viewpoint of the strict observance of the Food Additive Standard as well as the hygienic management.

When the calcium agent prepared by the latter process is used, as far as the pH of calcium carbonate employed is concerned, it is preferred, from the viewpoints of preventing a decrease in functions as an additive and enhancing efficiency upon pulverization and classification, to use the calcium carbonate powder having the pH of 11.7 or less at 25° C. of an aqueous suspension which is obtained by subjecting 200 cc of an aqueous suspension having the solid concentration of 20% by weight of calcium carbonate powder to supersonic wave-treatment under conditions of 300 W. 20 KHz for 10 minutes. More preferably, the calcium carbonate powder having the pH of 11.5 or less is more preferred to use.

The specific surface area of the calcium agent used as a material in the present invention measured by a nitrogen adsorption method (BET method) is preferable in the range of from 6 to 60 $m^2/g$. If it is less than 6 $m^2/g$, the stability for a long period of time in liquid foods such as cow's milk sometimes becomes problematic, while if it is more than 60 $m^2/g$, calcium carbonate particles sometimes aggregate so strongly that they are difficult to disperse.

As the dolomite usable in the present invention, a natural dolomite is pulverized by an H mill, a vertical type mill, a ball mill or a roller mill and then used.

The specific surface area of the dolomite powder measured by a nitrogen adsorption method (BET method) is preferable in the range of 1 to 50 $m^2/g$. If it is less than 1 $m^2/g$, the stability for a long period of time in liquid foods such as cow's milk sometimes becomes problematic, while if it is more than 50 $m^2/g$, dolomite particles sometimes aggregate so strongly that they are difficult to disperse.

Next, a food additive slurry composition is prepared which comprises at least one selected from a calcium agent (A) and dolomite, arabinogalactan (B) and/or a modified starch (C), and water.

The essential requirement for preparing the food additive slurry composition comprising at least one selected from a calcium agent and dolomite (A), arabinogalactan (B) and water is that the arabinogalactan (B) is contained in an amount of 0.5 to 60 parts by weight based on 100 parts by weight of at least one selected from the group consisting of a calcium agent and dolomite (A) contained in the food additive slurry composition. If the feeling in throat-passage of liquid foods such as yogurt and cow's milk is taken into consideration, the arabinogalactan (B) is preferably contained in an amount of 1.0 to 50 parts by weight, more preferably 1.5 to 40 parts by weight.

If the amount of the arabinogalactan is less than 0.5 part by weight, even when the average particle size in the particle size distribution of the calcium agent and/or dolomite contained in the food additive slurry composition is controlled minutely, if the slurry composition is added to liquid foods such as cow's milk, juice and yogurt of a drink type, the calcium agent and/or the dolomite is inferior in stability with passage of time, and in the worst case, aggregate and precipitate at the bottom of a container within 24 hours. On the other hand, if it is more than 60 parts by weight, eating impression is not only damaged by dietary fiber derived from the arabinogalactan, but the viscosity of the product increases. As a result, the production has to be limited to the product with a low solid concentration in order to achieve good handling, which is undesirable from the viewpoint of economy.

The essential requirement for preparing the food additive slurry composition comprising at least one selected from a calcium agent and dolomite (A), a modified starch (C) and water is that the modified starch (C) is contained in an amount of 0.1 to 80 parts by weight based on 100 parts by weight of at least one selected from the group consisting of a calcium agent and dolomite (A) contained in the food additive slurry composition, preferably, it is contained in an amount of 1 to 70 parts by weight, more preferably, it is contained in an amount of 2 to 50 parts by weight.

If the amount of the arabinogalactan is less than 0.1 part by weight, when the slurry composition is added to liquid foods such as cow's milk, juice and yogurt of a drink type, the calcium agent and/or the dolomite is inferior in stability with passage of time, and in the worst case, aggregate and precipitate at the bottom of a container within 24 hours. On the other hand, if it is more than 80 parts by weight, flavor inherent in the product is not only damaged due to saltiness and bitterness resulting from the modified starch, but the viscosity of the product increases. As a result, the production has to be limited to the product with a low solid concentration in order to achieve good handling, which is undesirable from the viewpoint of economy.

There are no problems at all when the food additive slurry composition comprising at least one selected from a calcium agent and dolomite (A), either arabinogalactan (B) or a modified starch (C) is added singly to cow's milk of a general type. However, in cases where it is added to a long relish period such as a long life cow's milk and juice, when a super high temperature sterilization is applied, the heat resistance and the stability with passage of time of the arabinogalactan (B) or the modified starch are somewhat insufficient. Thus, the stability with passage of time of the calcium agent and/or dolomite deteriorates to thereby make it difficult to keep the stability for a long period of time.

Moreover, when the food additive slurry composition is added to instant noodles, etc., as a mineral fortifying agent, it is required to contain minerals in an amount more than the indicated amount and further to uniformly disperse them with the main materials such as flour, but when the arabinogalactan (B) or the modified starch (C) is added singly, fluidity in the main materials becomes somewhat poor so that it is difficult to obtain foods enriched with minerals dispersed uniformly.

Accordingly, the preferable condition for producing a food additive slurry composition for use in a long life cow's milk prepared by a super high temperature sterilization method or a mineral-enriched food to be highly dispersed is that per 100 parts by weight of at least one selected from a calcium agent and dolomite (A), 0.5 to 60 parts by weight of arabinogalactan (B) and 0.1 to 80 parts by weight of a modified starch (C) are not only contained, but the total amount of the arabinogalactan (B) and the modified starch (C) is contained in an amount of 1 to 100 parts by weight, preferably 2 to 90 parts by weight, more preferably 3 to 80 parts by weight, per 100 parts by weight of at least one selected from the group consisting of a calcium agent and dolomite.

If the total amount of the arabinogalactan (B) and the modified starch (C) is less than 1 part by weight per 100 parts by weight of at least one selected from the group consisting of a calcium agent and dolomite (A), when, for example, the food additive composition is added to instant noodles as a mineral fortifying agent, the content of minerals in the instant noodles is variable and thus it is undesirable. On the other hand, if it is more than 100 parts by weight, the viscosity of the food additive slurry composition not only increases to thus result in difficulty in handling, but the food additive slurry composition and/or food additive powder composition gives an adverse effect to elasticity of the noodles so that eating impression is deteriorated, and thus it is undesirable.

The electric conductivity N (mS/cm) of the food additive slurry composition preferably satisfies the requirement (a) as set forth below, more preferably $0.18 \leq N \leq 2.50$, still more preferably $0.20 \leq N \leq 1.50$.

(a) $0.17 \leq N \leq 4.00$

N: Electric conductivity of a food additive slurry composition when it was pulverized and/or dispersed, then adjusted to a calcium agent solid concentration of 5% by weight.

If the electric conductivity N (mS/cm) is less than 0.17, the calcium agent becomes unstable in surface stability to be liable to re-aggregate, and thus, when the food additive slurry composition is used in cow's milk, etc., the stable product is difficult to be obtained, and if it is more than 4.00, when it is used in cow's milk, etc., the stability of protein is liable to be damaged to thus tend to increase the viscosity, which, in the worst case, leads to gelation.

The electric conductivity in the present invention is measured and calculated by the following manner:

Apparatus: Personal SC meter Model SC 82

Preparation of a specimen: A food additive slurry composition is adjusted with a solvent to a solid concentration of 5% by weight.

Solvent: Deionized water

The weight (volume) average particle diameter K (μm) of the calcium agent and/or dolomite contained in the food additive slurry composition preferably satisfies the requirement (α) as set forth below, and it more preferably satisfies the requirement (β), still more preferably (γ) in usage in which the storage stability for a fairly long period of time is required:

(α) $0.04 \leq K \leq 0.8$
(β) $0.04 \leq K \leq 0.5$
(γ) $0.04 \leq K \leq 0.3$ If the weight average diameter K in particle size distribution of the calcium agent and/or the dolomite contained in the food additive slurry composition is greater than 0.8 μm, the calcium agent and/or the dolomite is easy to precipitate so that the composition can not be used for foods being stored for a long period of time.

The adjustment of the weight average diameter of the calcium agent and/or the dolomite contained in the food additive slurry composition to 0.8 μm or less may be made by the methods as mentioned above. For the pulverization and/or dispersion by the physical method, wet-pulverizers such as Dyno-mill, Sand-mill and Cobol-mill, emulsifying and dispersing apparatuses such as Nanomizer, Microfluidizer and Homogenizer, supersonic wave disperser and roll mills such as a three-roll mill may be preferably used.

The weight average diameter in particle size distribution of the calcium agent and/or the dolomite contained in the food additive slurry composition of the calcium agent and/or the dolomite in the present invention is measured and calculated according to the following manner:

Apparatus: SA-CP4L manufactured by Shimadzu Corp.

Preparation of a specimen: A food additive slurry composition is added dropwise into a solvent heated to 20° C. to obtain a specimen for the measurement of the particle size distribution.

Solvent: Deionized water

Preliminary dispersing: Supersonic wave dispersion by the use of SK disperser (manufactured by Seishin Kigyo Co., Ltd.) was conducted for 100 seconds.

Measuring temperature: 20.0° C.±2.5° C.

The modified starch (C) usable in the present invention is not specifically limited, but in order to attain excellent stability in drinks being stored for a long period of time, starch obtained by one or more reaction or treatment selected from oxidation, acid treatment, enzyme treatment, esterification, etherification and crosslinking, i.e., one or more of acid-treated starch, oxidized starch, enzyme-modified dextrin, estrified starch, etherified starch and crosslinked starch is preferable, especially octenyl succinic acid-esterified starch is preferable. The octenyl succinic acid-esterified starch is obtained usually by making a starch suspension slightly alkaline and adding dropwise an octenyl succinic acid suspension to the starch suspension. Moreover, this starch may be used by being subjected to other treatments as above-mentioned or may be used in combination with the other modified starches. As the modified starch, PURITY GUM 1773, PURITY GUM 2000, N-CREAMER 46, CAPSUL (trade names of National Starch Co., Ltd.), EMULSTAR 30 A (trade name of Matsutani Chemical Co., Ltd.) may be exemplified.

The kind of a material of starch used in the present invention is not specifically limited, but waxicorn starch is preferable from the viewpoint of stability and viscosity of a slime.

In the foregoing way, a food additive slurry composition comprising at least one selected from the group consisting of a calcium agent and a dolomite (A), arabinogalactan (B) and/or a modified starch (C), and water are prepared, and a food additive powder composition is prepared by drying and pulverizing the slurry composition. The drying machine usable for drying the slurry composition is not specifically limited, but it is desirable to conduct drying in an extremely short time from the standpoint of preventing a change of properties. As such drying machine, a dryer of a liquid drop-spray type such as a spay dryer, a slurry dryer using a ceramic medium in a heated and fluidized state are preferably used.

The food additive slurry or powder compositions of the present invention are very excellent in re-dispersibility in water so that they are easily dispersed in water without using a specific disperser or stirring machine.

Accordingly, in preparing foods, for example, a calcium and magnesium enriched cow's milk using the food additive slurry or powder composition, it is sufficient to add to cow's milk the food additive slurry or powder composition and to stir the mixture strongly to thus allow the slurry or powder composition to be dispersed in the cow's milk, but it is also possible to add to the cow's milk an aqueous dispersion obtained by preliminarily dispersing in water the food additive slurry or powder composition. In the case of a reducing milk, it is possible to add the food additive slurry or powder composition to butter or butter oil dissolved at 60° C. or so, and to stir the mixture at a high speed, thereafter to add reducing defatted milk or non-fat dry milk for homogenization.

The calcium and magnesium-enriched cow's milk prepared by the above-mentioned method contains the calcium and/or dolomite removable by a clarifier in much smaller amounts than that containing calcium and/or magnesium prepared by the conventional method. That is, in foods such as cow's milk, yogurt and juice added with the food additive slurry or powder composition, the calcium agent and/or the dolomite are maintained in an extremely stable state. Moreover, the food additive slurry or powder composition of the present invention contain the calcium agent and/or the dolomite in a good state and thus it is possible to reduce the stirring time at the time of adding them to foods such as cow's milk. As a result, aggregation of the calcium agent and/or the dolomite which can be seen in cases where they are added to butter and stirred for a long time does not take place.

The food additive slurry or powder composition can be used, besides the above-described usage, for liquid foods such as cream, coffee, black tea, Oolong tea, and alcoholic beverage such as wine and sake for the purpose of enrichment of calcium and/or magnesium agents.

Further, when preparing the calcium and magnesium-enriched instant noodles by the use of the food additive slurry composition and/or powder composition of the present invention, it is sufficient to directly add to powder as a material of the instant noodles the food additive slurry composition and/or powder composition of the present invention and to disperse the food additive slurry and/or powder composition by stirring and mixing. In the case of the calcium-enriched biscuits and other foods as well, it is sufficient to add and disperse in a material in the same manner.

Moreover, the food additive slurry or powder composition of the present invention may be used conjointly with water-soluble calcium salts such as calcium lactate and calcium chloride, and water-soluble magnesium salts such as magnesium chloride and magnesium sulfate.

Hereinafter, the present invention will be explained in more detail by way of examples and comparative examples, but the present invention is in no way limited to these examples.

First, production methods for calcium carbonate, calcium phosphate and dolomite used in examples and comparative examples will be described as below:

Reference Example 1

Calcium Carbonate

To 10000 of milk of lime having a specific gravity of 1.050 heated to 10° C., a furnace gas having a carbon dioxide gas concentration of 27% by weight (hereinafter, referred to as "carbon dioxide gas") was supplied at a rate of 25 m$^3$/min to thus cause the carbonation reaction to proceed and an aqueous calcium carbonate suspension having a pH 9.0 at 25° C. was thereby obtained.

Next, the aqueous calcium carbonate suspension having the pH 9.0 was stirred at 50° C. for 12 hours and when the suspension reached a pH 11.8 at 25° C., the suspension was dehydrated by the use of a filter press to thus obtain a dehydrated cake having a calcium carbonate solid concentration of 48% by weight. Then, to the dehydrated cake obtained, water was added again and stirred to thus obtain an aqueous calcium carbonate suspension having the same concentration as that prior to dehydration. The pH of the aqueous calcium carbonate suspension was 11.5. To the aqueous calcium carbonate suspension, carbon dioxide gas was introduced again to thus lower the pH of this suspension to 7.0, thereafter subjected to dehydration by the use of a filter press, drying by the use of a paddle dryer and pulverization by the use of a dry-pulverizer to thereby obtain a calcium carbonate powder.

The specific surface area of the calcium carbonate powder by a nitrogen adsorption method was measured by the use of a surface area measuring apparatus NOVA 2000 manufactured by QUANTA CHROME Co., Ltd., and the result was 30 m$^2$/g.

Reference Example 2

Calcium Phosphate

After secondary ammonium phosphate was added to an aqueous strong ammoniacal calcium chloride solution, the mixture was stirred and dehydrated. The cake obtained was washed with water several times, dried and dry-pulverized to thus obtain a whitish powder. The whitish powder was confirmed to be calcium tertiary phosphate by an X-ray diffraction.

After having confirmed in the above way, an aqueous suspension of the calcium tertiary phosphate was dehydrated by the use of a filter press and the press cake obtained was dried by the use of a paddle dryer and pulverized by the use of a dry-pulverizer to thereby obtain a calcium tertiary phosphate powder.

The specific surface area of the calcium tertiary phosphate powder by a nitrogen adsorption method was measured by the use of a surface area measuring apparatus NOVA 2000 manufactured by QUANTA CHROME Co., Ltd., and the result was 40 m$^2$/g.

Reference Example 3

Dolomite

After a natural dolomite was washed several times, it was dry-pulverized by an H mill and classified to thus obtain a whitish powder. It was confirmed by an X-ray diffraction that the whitish powder was a mixture of calcium carbonate and magnesium carbonate. Moreover, the content of calcium and magnesium in the whitish powder was measured and the results are 21% by weight and 12% by weight, respectively.

The specific surface area of the obtained powder by a nitrogen adsorption method was measured by the use of a surface area measuring apparatus NOVA 2000 manufactured by QUANTA CHROME Co., Ltd., and the result was 5 m$^2$/g.

EXAMPLE 1

A highly concentrated food additive slurry composition using the calcium carbonate powder obtained by Reference Example 1 was produced by adding, based on 100 parts by weight of a solid concentration of calcium carbonate, 20 parts by weight of arabinogalactan and water, mixing the mixture with stirring to obtain a food additive slurry having a calcium carbonate solid concentration of 40% by weight, and wet-pulverizing the slurry by the use of a wet-pulverizer Dyno-mill KD Pilot type (manufactured by WAB Co., Ltd.). The weight average particle diameter in particle size distribution of calcium carbonate of the food additive slurry composition was 0.20 µm. Moreover, a sample of the food additive slurry composition after wet-pulverization was diluted to a solid concentration of 5% by weight and the electric conductivity was measured and the result was 0.45 mS/cm.

The highly concentrated food additive slurry composition obtained was sufficiently low in viscosity and satisfactory in fluidity. Meanwhile, the arabinogalactan was added as dissolved in water preliminarily.

EXAMPLES 2 AND 9

Highly concentrated food additive slurry compositions were produced in the same manner as in Example 1, except that the conditions were changed as shown in Table 1. The highly concentrated food additive compositions obtained by Examples 2 and 9 were attempted to he enhanced to 40% by weight in solid concentration as in Example 1, but their solid concentrations were as shown in Table 1 because with 40% by weight, handling was difficult so that the composition had to be diluted to a degree of not interfering-with handling.

The weight average particle diameters in particle size distribution of the calcium agent contained in the food additive slurry compositions and the electric conductivities after wet-pulverization were measured in the same manner as in Example 1. The results are shown in Table 1.

EXAMPLE 3

A highly concentrated food additive slurry composition using the calcium tertiary phosphate powder obtained by Reference Example 2 was produced by adding, based on 100 parts by weight of a solid concentration of calcium phosphate, 13 parts by weight of a modified starch and water, mixing the mixture with stirring to obtain a food additive slurry composition, and wet-pulverizing the slurry composition by the use of a wet-pulverizer Dyno-mill KD pilot type. The highly concentrated food additive slurry composition was sufficiently low in viscosity and satisfactory in fluidity.

The weight average particle diameter in particle size distribution of the calcium agent contained in the food additive slurry composition and the electric conductivity after wet-pulverization were measured in the same manner as in Example 1. The results are shown in Table 1. Meanwhile, the modified starch was added as dissolved in water preliminarily.

EXAMPLES 4 AND 10

Highly concentrated food additive slurry compositions were produced in the same manner as in Example 3, except that the conditions were changed as shown in Table 1. The highly concentrated food additive compositions obtained by Examples 4 and 10 were attempted to be enhanced to 40% by weight in calcium solid concentration as in Example 1, but their solid concentrations were those as shown in Table 1 because with 40% by weight, handling was difficult so that the compositions had to be diluted to a degree of not interfering with handling.

The weight average particle diameters in particle size distributions of the calcium agent or dolomite contained in the food additive slurry compositions and the electric conductivities after wet-pulverization were measured in the same manner as in Example 1. The results are shown in Table 1.

EXAMPLE 5

A highly concentrated food additive slurry composition using the calcium carbonate powder obtained by Reference Example 1 was produced by adding, based on 100 parts by weight of a solid concentration of calcium carbonate, 33 parts by weight of arabinogalactan and 15 parts by weight of a modified starch and water, mixing the mixture with stirring to obtain a food additive slurry having a calcium carbonate solid concentration of 40% by weight, and wet-pulverizing the slurry by the use of a wet-pulverizer Dyno-mill KD Pilot type.

The highly concentrated food additive slurry composition obtained was sufficiently low in viscosity and satisfactory in fluidity. Meanwhile, the arabinogalactan and the modified starch were added as dissolved in water preliminarily.

The weight average particle diameter in particle size distribution of the calcium agent contained in the food additive slurry composition and the electric conductivity after wet-pulverization were measured in the same manner as in Example 1. The results are shown in Table 1.

EXAMPLES 6 TO 8, 11

Highly concentrated food additive slurry compositions were produced in the same manner as in Example 5, except that the conditions were changed as shown in Table 1. The solid concentrations of the highly concentrated food additive compositions obtained by these examples were attempted to be enhanced to 40% by weight as in Example 5, but their solid concentrations were as shown in Table 1 because with 40% by weight, handling was difficult so that the compositions had to be diluted to a degree of not interfering with handling.

The weight average particle diameters in particle size distribution of the calcium agent or dolomite contained in the food additive slurry compositions and the electric conductivities after wet-pulverization were measured in the same manner as in Example 1 and the results are shown in Table 1.

Comparative Examples 1, 9

Food additive slurry compositions were produced in the same manner as in Example 1, except that the conditions were changed as shown in Table 1. The solid concentrations in calcium agent of the food additive compositions obtained by those comparative examples were attempted to be enhanced to 40% by weight as in Example 1, but their solid concentrations were as shown in Table 1 because with 40% by weight, handling was difficult so that the compositions had to be diluted to a degree of not interfering with handling.

The weight average particle diameters in particle size distributions of the calcium agent or dolomite contained in the food additive slurry compositions and the electric conductivities after wet-pulverization were measured in the same manner as in Example 1 and the results are shown in Table 1.

Comparative Examples 2 and 8

Food additive slurry compositions were produced in the same manner as in Example 3, except that the conditions were changed as shown in Table 1. The solid concentrations in calcium agent of the food additive compositions obtained by those comparative examples were attempted to be enhanced to 40% by weight as in Example 1, but their solid concentrations were as shown in Table 1 because with 40% by weight, handling was difficult so that the compositions had to be diluted to a degree of not interfering with handling.

The weight average particle diameters in particle size distributions of the calcium agent contained in the food additive slurry compositions and the electric conductivities after wet-pulverization were measured in the same manner as in Example 1 and the results are shown in Table 1.

Comparative Examples 3 and 4

Food additive slurry compositions were produced in the same manner as in Example 5, except that the conditions were changed as shown in Table 1. The solid concentrations in calcium agent of the food additive compositions obtained by those comparative examples were attempted to be enhanced to 40% by weight as in Example 5, but their solid concentrations were as shown in Table 1 because with 40% by weight, handling was difficult so that the compositions had to be diluted to a degree of not interfering with handling.

The weight average particle diameters in particle size distributions of the calcium agent contained in the food additive slurry compositions and the electric conductivities after wet-pulverization were measured in the same manner as in Example 1 and the results are shown in Table 1.

Comparative Example 5

A highly concentrated food additive slurry composition using the calcium carbonate obtained by Reference Example 1 was produced by adding, based on 100 parts by weight of a solid content of calcium carbonate, 12 parts by weight of an enzyme-decomposed lecithin and water, mixing the mixture with stirring and wet-pulverizing the slurry composition by the use of a wet-pulverizer Dyno-mill KD pilot type to obtain a highly concentrated food additive slurry composition. The solid concentration in calcium agent of the food additive composition obtained was attempted to be enhanced to 40% by weight as in Example 1, but its solid concentration was as shown in Table 1 because with 40% by weight, handling was difficult due to high viscosity so that the composition had to be diluted to a degree of not interfering with handling. The weight average particle diameter in particle size distribution of the calcium agent contained in the food additive slurry composition and the electric conductivity after wet-pulverization was measured in the same manner as in Example 1 and the results are shown in Table 1. Meanwhile, the enzyme-decomposed lecithin was added as dissolved in water preliminarily.

Comparative Examples 6 and 7

Food additive slurry compositions were produced in the same manner as in Comparative Example 5, except that the conditions were changed as shown in Table 1. The solid concentrations in calcium agent of the food additive compositions obtained by those comparative examples were attempted to be enhanced to 40% by weight as in Example 1, but their solid concentrations were as shown in Table 1 because with 40% by weight, handling was difficult so that the compositions had to be diluted to a degree of not interfering with handling.

The weight average particle diameters in particle size distributions of the calcium agent contained in the food additive slurry compositions and the electric conductivity after wet-pulverization was measured in the same manner as in Example 1 and the results are shown in Table 1.

Meanwhile, the sucrose fatty acid ester and propylene glycol alginate were used as dissolved in water heated to 65° C., then cooled to 20° C. preliminarily.

EXAMPLES 12 TO 22

Comparative Examples 10 to 18

The food additive slurry compositions obtained by Examples 1 to 11 and Comparative Examples 1 to 9 were dried by the use of a spray dryer to thus obtain food additive powder compositions.

Next, the food additive powder compositions obtained by Examples 12 to 22 and Comparative Examples 10 to 18 were added into water stirred at 11000 rpm for 15 minutes by the use of a Homomixer so that re-dispersed suspensions having the same slurry concentrations in calcium agent and/or dolomite as those prior to being powdered were prepared. The viscosities of the re-dispersed suspensions of the food additive powder compositions were nearly the same as those of the food additive slurry compositions before drying and fluidities were quite satisfactory.

The weight average particle diameters in particle size distributions of the calcium agent and/or the dolomite contained in the re-dispersed suspensions are shown in Table 2.

TABLE 1

|  | Arabinogalactan parts by wt. | Modified starch parts by wt. | Other additives parts by wt. | Kind of Ca/Mg agents | Solid conc. wt. % | Electric conductivity N mS/cm | Weight average particle diameter K μm |
|---|---|---|---|---|---|---|---|
| Example 1 | 20 | — | — | Calcium carbonate | 40 | 0.45 | 0.20 |
| Example 2 | 0.9 | — | — | Calcium carbonate | 30 | 0.19 | 0.35 |
| Example 3 | — | 13 | — | Calcium phosphate | 40 | 0.38 | 0.22 |
| Example 4 | — | 78 | — | Calcium carbonate Calcium phosphate | 30 | 1.21 | 0.19 |
| Example 5 | 33 | 15 | — | Calcium carbonate | 40 | 0.67 | 0.18 |
| Example 6 | 0.7 | 0.6 | — | Calcium phosphate | 30 | 0.21 | 0.30 |

TABLE 1-continued

|  | Arabinogalactan parts by wt. | Modified starch parts by wt. | Other additives parts by wt. | Kind of Ca/Mg agents | Solid conc. wt. % | Electric conductivity N mS/cm | Weight average particle diameter K μm |
|---|---|---|---|---|---|---|---|
| Example 7 | 33 | 55 | — | Calcium phosphate | 30 | 1.83 | 0.18 |
| Example 8 | 1.2 | 0.7 | — | Calcium carbonate | 35 | 0.28 | 0.27 |
| Example 9 | 56 | — | — | Dolomite | 30 | 0.98 | 0.20 |
| Example 10 | — | 0.2 | — | Dolomite | 25 | 0.18 | 0.39 |
| Example 11 | 61 | 35 | — | Dolomite | 25 | 2.01 | 0.19 |
| Comp. Ex. 1 | 0.4 | — | — | Calcium carbonate | 15 | 0.17 | 0.51 |
| Comp. Ex. 2 | — | 83 | — | Calcium phosphate | 20 | 1.72 | 0.19 |
| Comp. Ex. 3 | 0.3 | 0.08 | — | Calcium phosphate | 15 | 0.18 | 0.50 |
| Comp. Ex. 4 | 70 | 32 | — | Calcium carbonate | 15 | 2.55 | 0.19 |
| Comp. Ex. 5 | — | — | Enzyme-decomposed lecithin 12 | Calcium carbonate | 20 | 0.44 | 0.30 |
| Comp. Ex. 6 | — | — | S.E 20 | Calcium carbonate | 15 | 0.25 | 0.16 |
| Comp. Ex. 7 | — | — | PGA 5 | Calcium phosphate | 15 | 0.27 | 0.19 |
| Comp. Ex. 8 | — | 0.09 | — | Dolomite | 15 | 0.16 | 0.78 |
| Comp. Ex. 9 | 62 | — | — | Dolomite | 20 | 0.75 | 0.20 |

N: Electric conductivity of a food additive slurry composition when it was pulverized and/or dispersed, then adjusted to a solid concentration of 5% by weight (mS/cm)
K: Weight average particle diameter in particle size distribution of a calcium agent and/or a dolomite contained in a food additive slurry composition (μm)
S. E: Sucrose fatty acid ester
PGA: Propylene glycol alginate

TABLE 2

|  | Weight average particle diameter Z μm |
|---|---|
| Example 12 | 0.21 |
| Example 13 | 0.34 |
| Example 14 | 0.22 |
| Example 15 | 0.19 |
| Example 16 | 0.19 |
| Example 17 | 0.31 |
| Example 18 | 0.19 |
| Example 19 | 0.29 |
| Example 20 | 0.21 |
| Example 21 | 0.40 |
| Example 22 | 0.18 |
| Comp. Ex. 10 | 0.52 |
| Comp. Ex. 11 | 0.20 |
| Comp. Ex. 12 | 0.50 |
| Comp. Ex. 13 | 0.19 |
| Comp. Ex. 14 | 0.31 |
| Comp. Ex. 15 | 0.16 |
| Comp. Ex. 16 | 0.18 |
| Comp. Ex. 17 | 0.79 |
| Comp. Ex. 18 | 0.19 |

Z: Weight average particle diameter in particle size distribution in a re-duspersed suspension of a calcium agent powder composition or a dolomite powder composition (μm)

Next, the food additive slurry compositions and the re-dispersed suspensions of the powder compositions prepared by Examples 1 to 22 and Comparative Examples 1 to 18 were diluted to 0.75% by weight in solid concentration of the calcium agent and 0.91% by weight in solid concentration of the dolomite, respectively. Each of the diluted suspensions was taken into a 100 ml measuring cylinder and left to stand at 10° C. to thus separate a transparent portion caused by precipitates of calcium carbonate or dolomite and a colored portion dispersed by the calcium agent and/or dolomite. Changes with time in the interfacial height and the amount of the precipitate were visually inspected and stability of each suspension in water was observed. Scale by ml was read and the results are shown by the following 5-rank evaluation in Table 3.

Interfacial Height
Interfacial height is not less than 98 ml and not more than 100 ml:5
Interfacial height is not less than 95 ml and less than 98 ml:4
Interfacial height is not less than 90 ml and less than 95 ml:3
Interfacial height is not less than 50 ml and 90 ml:2
Interfacial height is less than 50 ml:1

Amount of Precipitate
Precipitate is rarely observed:5
Precipitate is slightly observed:4
Precipitate in about 0.5 mm or less is observed:3
Precipitate in not less than 0.5 mm and less than 2 mm is observed:2
Precipitate in not less than 2 mm is observed:1

TABLE 3

|  | Interfacial height After | | | Amount of precipitate After | | |
|---|---|---|---|---|---|---|
|  | 1 day | 3 days | 7 days | 1 day | 3 days | 7 days |
| Example 1 | 5 | 5 | 5 | 5 | 5 | 5 |
| Example 2 | 4 | 4 | 4 | 4 | 4 | 4 |
| Example 3 | 5 | 5 | 5 | 5 | 5 | 5 |
| Example 4 | 5 | 5 | 5 | 5 | 5 | 5 |
| Example 5 | 5 | 5 | 5 | 5 | 5 | 5 |
| Example 6 | 4 | 4 | 4 | 5 | 4 | 4 |
| Example 7 | 5 | 5 | 5 | 5 | 5 | 5 |
| Example 8 | 5 | 5 | 4 | 5 | 4 | 4 |
| Example 9 | 5 | 5 | 5 | 5 | 5 | 5 |
| Example 10 | 4 | 4 | 3 | 4 | 3 | 3 |
| Example 11 | 5 | 5 | 5 | 5 | 5 | 5 |
| Example 12 | 5 | 5 | 5 | 5 | 5 | 5 |
| Example 13 | 5 | 4 | 4 | 5 | 4 | 4 |
| Example 14 | 5 | 5 | 5 | 5 | 5 | 5 |
| Example 15 | 5 | 5 | 5 | 5 | 4 | 4 |
| Example 16 | 5 | 5 | 5 | 5 | 5 | 5 |
| Example 17 | 4 | 4 | 3 | 4 | 4 | 4 |
| Example 18 | 5 | 5 | 5 | 5 | 5 | 5 |

TABLE 3-continued

|  | Interfacial height After | | | Amount of precipitate After | | |
| --- | --- | --- | --- | --- | --- | --- |
|  | 1 day | 3 days | 7 days | 1 day | 3 days | 7 days |
| Example 19 | 5 | 4 | 4 | 5 | 4 | 4 |
| Example 20 | 5 | 5 | 5 | 5 | 5 | 5 |
| Example 21 | 4 | 3 | 3 | 4 | 3 | 3 |
| Example 22 | 5 | 5 | 5 | 5 | 5 | 5 |
| Comp. Ex. 1 | 3 | 2 | 2 | 2 | 2 | 1 |
| Comp. Ex. 2 | 5 | 5 | 5 | 5 | 5 | 5 |
| Comp. Ex. 3 | 2 | 2 | 1 | 2 | 2 | 2 |
| Comp. Ex. 4 | 5 | 5 | 5 | 5 | 5 | 5 |
| Comp. Ex. 5 | 5 | 5 | 4 | 5 | 5 | 4 |
| Comp. Ex. 6 | 5 | 5 | 5 | 5 | 5 | 5 |
| Comp. Ex. 7 | 5 | 5 | 5 | 5 | 5 | 5 |
| Comp. Ex. 8 | 2 | 2 | 1 | 3 | 2 | 2 |
| Comp. Ex. 9 | 5 | 5 | 5 | 5 | 5 | 5 |
| Comp. Ex. 10 | 3 | 2 | 1 | 3 | 2 | 2 |
| Comp. Ex. 11 | 5 | 5 | 5 | 5 | 5 | 5 |
| Comp. Ex. 12 | 3 | 2 | 2 | 2 | 2 | 2 |
| Comp. Ex. 13 | 5 | 5 | 5 | 5 | 5 | 5 |
| Comp. Ex. 14 | 5 | 4 | 4 | 4 | 4 | 4 |
| Comp. Ex. 15 | 5 | 5 | 5 | 5 | 5 | 5 |
| Comp. Ex. 16 | 5 | 5 | 5 | 5 | 5 | 5 |
| Comp. Ex. 17 | 2 | 1 | 1 | 2 | 1 | 1 |
| Comp. Ex. 18 | 5 | 5 | 5 | 5 | 5 | 5 |

EXAMPLE 23

200 g of the food additive slurry composition prepared by Example 1 were dispersed in 500 g of butter dissolved at 60° C. This dispersion was added with stirring into 9.30 Kg of defatted milk and the mixture was sterilized to thus obtain a calcium-enriched milk. The calcium-enriched milk was taken into several measuring cylinders of 100 ml and they were stored at 5° C. The milk was taken out quietly periodically and a change with time in the amount of the precipitate at the bottom of the measuring cylinder was visually inspected. The results were shown by the following 4-rank evaluation in Table 4.

Moreover, the sensory test for flavor of the calcium-enriched milk was carried out by 10 men and women and the results were shown by the following 5-rank evaluation in Table 4.

Amount of Precipitate
Precipitate is rarely observed:4
Precipitate is slightly observed:3
Precipitate in a small amount is observed:2
Precipitate in a large amount is observed:1

Flavor
Flavor is good:5
Flavor is slightly concerned about (Incongruity is somewhat felt.):4
Flavor is slightly bad (Unpleasantness is somewhat felt.):3
Flavor is considerably bad (Unpleasantness is considerably felt.):2
Flavor is very bad (Unpleasantness is strongly felt.):1

EXAMPLES 24 TO 30, EXAMPLES 34 TO 41

Comparative Examples 19 to 25, Comparative Examples 28 to 34

Calcium-enriched cow's milks were obtained in the same manner as in Example 23, except that the food additive slurry compositions or the re-dispersed suspensions of the food additive slurry or powder compositions prepared by Examples 2 to 8, Examples 12 to 19, Comparative Examples 1 to 7, Comparative Examples 10 to 16 were used and that each calcium agent concentration was adjusted to the same concentration as in Example 23. The inspection of the precipitate and sensory test for flavor were performed in the same manner as in Example 23. The results are shown in Table 4.

EXAMPLE 31

445 g of the food additive slurry composition prepared by Example 9 were dispersed in 500 g of butter dissolved at 60° C. This dispersion was added with stirring into 9.05 Kg of defatted milk and the mixture was sterilized to thus obtain calcium and magnesium-enriched milk. The inspection of the precipitate and sensory test for flavor were performed in the same manner as in Example 23. The results are shown in Table 4.

EXAMPLES 32, 33, 42 TO 44

Comparative Examples 26, 27, 35, 36

Calcium and magnesium-enriched cow's milks were obtained in the same manner as in Example 31, except that the food additive slurry compositions or the re-dispersed suspensions of the food additive powder compositions prepared by Examples 10, 11, 20 to 22, Comparative Examples 8, 9, 17 and 18 were used and that each calcium and magnesium concentration was adjusted to the same concentration as in Example 31. The inspection of the precipitate and sensory test for flavor were performed in the same manner as in Example 23. The results are shown in Table 4.

TABLE 4

|  | Calcium agent and/or dolomite slurry comp. or re-dispersed suspension of powder comp. | Amount of precipitate After | | | Flavor |
| --- | --- | --- | --- | --- | --- |
|  |  | 3 day | 7 days | 14 days |  |
| Example 23 | Product of Example 1 | 4 | 4 | 4 | 5 |
| Example 24 | Product of Example 2 | 4 | 3 | 3 | 4 |
| Example 25 | Product of Example 3 | 4 | 4 | 4 | 5 |
| Example 26 | Product of Example 4 | 4 | 4 | 4 | 4 |
| Example 27 | Product of Example 5 | 4 | 4 | 4 | 5 |
| Example 28 | Product of Example 6 | 4 | 3 | 3 | 4 |
| Example 29 | Product of Example 7 | 4 | 4 | 3 | 4 |
| Example 30 | Product of Example 8 | 4 | 4 | 3 | 4 |
| Example 31 | Product of Example 9 | 4 | 4 | 4 | 5 |
| Example 32 | Product of Example 10 | 3 | 3 | 3 | 4 |
| Example 33 | Product of Example 11 | 4 | 4 | 3 | 3 |

TABLE 4-continued

| | Calcium agent and/or dolomite slurry comp. or re-dispersed suspension of powder comp. | Amount of precipitate After | | | Flavor |
|---|---|---|---|---|---|
| | | 3 day | 7 days | 14 days | |
| Example 34 | Product of Example 12 | 4 | 4 | 4 | 5 |
| Example 35 | Product of Example 13 | 4 | 3 | 3 | 4 |
| Example 36 | Product of Example 14 | 4 | 4 | 4 | 5 |
| Example 37 | Product of Example 15 | 4 | 4 | 3 | 4 |
| Example 38 | Product of Example 16 | 4 | 4 | 4 | 5 |
| Example 39 | Product of Example 17 | 4 | 3 | 3 | 4 |
| Example 40 | Product of Example 18 | 4 | 4 | 3 | 3 |
| Example 41 | Product of Example 19 | 4 | 3 | 3 | 4 |
| Example 42 | Product of Example 20 | 4 | 4 | 4 | 5 |
| Example 43 | Product of Example 21 | 3 | 3 | 3 | 4 |
| Example 44 | Product of Example 22 | 4 | 4 | 4 | 3 |
| Comp. Ex. 19 | Product of Comp. Ex. 1 | 2 | 1 | 1 | 1 |
| Comp. Ex. 20 | Product of Comp. Ex. 2 | 4 | 3 | 3 | 2 |
| Comp. Ex. 21 | Product of Comp. Ex. 3 | 2 | 2 | 1 | 2 |
| Comp. Ex. 22 | Product of Comp. Ex. 4 | 4 | 4 | 3 | 2 |
| Comp. Ex. 23 | Product of Comp. Ex. 5 | 4 | 4 | 3 | 1 |
| Comp. Ex. 24 | Product of Comp. Ex. 6 | 4 | 4 | 4 | 5 |
| Comp. Ex. 25 | Product of Comp. Ex. 7 | 4 | 4 | 4 | 5 |
| Comp. Ex. 26 | Product of Comp. Ex. 8 | 1 | 1 | 1 | 1 |
| Comp. Ex. 27 | Product of Comp. Ex. 9 | 4 | 4 | 3 | 2 |
| Comp. Ex. 28 | Product of Comp. Ex. 10 | 1 | 1 | 1 | 1 |
| Comp. Ex. 29 | Product of Comp. Ex. 11 | 4 | 3 | 3 | 2 |
| Comp. Ex. 30 | Product of Comp. Ex. 12 | 2 | 2 | 2 | 2 |
| Comp. Ex. 31 | Product of Comp. Ex. 13 | 4 | 4 | 3 | 2 |
| Comp. Ex. 32 | Product of Comp. Ex. 14 | 4 | 4 | 3 | 1 |
| Comp. Ex. 33 | Product of Comp. Ex. 15 | 4 | 4 | 4 | 5 |
| Comp. Ex. 34 | Product of Comp. Ex. 16 | 4 | 4 | 4 | 5 |
| Comp. Ex. 35 | Product of Comp. Ex. 17 | 1 | 1 | 1 | 1 |
| Comp. Ex. 36 | Product of Comp. Ex. 18 | 4 | 4 | 3 | 2 |

EXAMPLE 45

200 g of the food additive slurry composition prepared by Example 1 were dispersed in 300 g of butter dissolved at 60° C. This dispersion was added with stirring-into 9.50 Kg of defatted milk and the mixture was sterilized at an ultra high temperature to thus obtain a long-Life calcium-enriched milk. The inspection of the precipitate and sensory test for flavor were performed in the same manner as in Example 23. The results are shown in Table 5.

EXAMPLES 46 TO 52, EXAMPLES 56 TO 63

Comparative Examples 37 to 43,

Comparative Examples 46 to 52

Long-life calcium-enriched cow's milks were obtained in the same manner as in Example 45, except that the food additive slurry compositions or the re-dispersed suspensions of the food additive powder compositions prepared by Examples 2 to 8, Examples 12 to 19, Comparative Examples 1 to 7, Comparative Examples 10 to 16 were used and that each calcium agent concentration was adjusted to the same concentration as in Example 45. The inspection of the precipitate and sensory test for flavor were performed in the same manner as in Example 23. The results are shown in Table 5.

EXAMPLE 53

445 g of the food additive slurry composition prepared by Example 9 were dispersed in 300 g of butter dissolved at 60° C. This dispersion was added with stirring into 9.05 Kg of defatted milk and the mixture was sterilized at an ultra high temperature to thus obtain a long-life calcium and magnesium-enriched milk. The inspection of the precipitate and sensory test for flavor were performed in the same manner as in Example 23. The results are shown in Table 5.

EXAMPLES 54, 55, 64 TO 66

Comparative Examples 44, 45, 53, 54

Long-life calcium and magnesium-enriched cow's milks were obtained in the same manner as in Example 53, except that the food additive slurry compositions or the re-dispersed suspensions of the food additive powder compositions prepared by Examples 10, 11, 20 to 22, Comparative Examples 8, 9, 17 and 18 were used and that each calcium and magnesium concentration was adjusted to the same concentration as in Example 53. The inspection of the precipitate and sensory test for flavor were performed in the same manner as in Example 23. The results are shown in Table 5.

TABLE 5

| | Calcium agent and/or dolomite slurry comp. or re-dispersed suspension of powder comp. | Amount of precipitate After | | | Flavor |
|---|---|---|---|---|---|
| | | 10 days | 20 days | 14 days | |
| Example 45 | Product of Example 1 | 3 | 3 | 2 | 4 |
| Example 46 | Product of Example 2 | 2 | 2 | 2 | 3 |
| Example 47 | Product of Example 3 | 3 | 2 | 2 | 4 |
| Example 48 | Product of Example 4 | 3 | 3 | 2 | 3 |
| Example 49 | Product of Example 5 | 4 | 4 | 4 | 5 |
| Example 50 | Product of Example 6 | 4 | 3 | 3 | 5 |
| Example 51 | Product of Example 7 | 4 | 4 | 4 | 4 |
| Example 52 | Product of Example 8 | 4 | 4 | 3 | 4 |
| Example 53 | Product of Example 9 | 3 | 3 | 2 | 3 |
| Example 54 | Product of Example 10 | 3 | 2 | 1 | 2 |
| Example 55 | Product of Example 11 | 4 | 4 | 4 | 3 |
| Example 56 | Product of Example 12 | 3 | 3 | 2 | 4 |
| Example 57 | Product of Example 13 | 3 | 2 | 2 | 3 |
| Example 58 | Product of Example 14 | 3 | 2 | 2 | 4 |
| Example 59 | Product of Example 15 | 3 | 3 | 2 | 3 |
| Example 60 | Product of Example 16 | 4 | 4 | 4 | 5 |
| Example 61 | Product of Example 17 | 4 | 3 | 3 | 5 |
| Example 62 | Product of Example 18 | 4 | 4 | 4 | 3 |
| Example 63 | Product of Example 19 | 4 | 3 | 3 | 4 |
| Example 64 | Product of Example 20 | 3 | 3 | 2 | 3 |
| Example 65 | Product of Example 21 | 3 | 2 | 2 | 2 |
| Example 66 | Product of Example 22 | 4 | 4 | 4 | 3 |
| Comp. Ex. 37 | Product of Comp. Ex. 1 | 1 | 1 | 1 | 1 |
| Comp. Ex. 38 | Product of Comp. Ex. 2 | 3 | 2 | 2 | 2 |
| Comp. Ex. 39 | Product of Comp. Ex. 3 | 2 | 2 | 2 | 2 |
| Comp. Ex. 40 | Product of Comp. Ex. 4 | 4 | 3 | 3 | 2 |
| Comp. Ex. 41 | Product of Comp. Ex. 5 | 3 | 3 | 2 | 1 |
| Comp. Ex. 42 | Product of Comp. Ex. 6 | 4 | 4 | 4 | 5 |
| Comp. Ex. 43 | Product of Comp. Ex. 7 | 4 | 4 | 4 | 5 |
| Comp. Ex. 44 | Product of Comp. Ex. 8 | 1 | 1 | 1 | 1 |
| Comp. Ex. 45 | Product of Comp. Ex. 9 | 3 | 2 | 2 | 2 |
| Comp. Ex. 46 | Product of Comp. Ex. 10 | 1 | 1 | 1 | 1 |
| Comp. Ex. 47 | Product of Comp. Ex. 11 | 3 | 3 | 2 | 2 |
| Comp. Ex. 48 | Product of Comp. Ex. 12 | 2 | 2 | 2 | 1 |
| Comp. Ex. 49 | Product of Comp. Ex. 13 | 3 | 3 | 2 | 2 |
| Comp. Ex. 50 | Product of Comp. Ex. 14 | 3 | 3 | 2 | 1 |
| Comp. Ex. 51 | Product of Comp. Ex. 15 | 4 | 4 | 4 | 5 |
| Comp. Ex. 52 | Product of Comp. Ex. 16 | 4 | 4 | 4 | 5 |
| Comp. Ex. 53 | Product of Comp. Ex. 17 | 1 | 1 | 1 | 1 |
| Comp. Ex. 54 | Product of Comp. Ex. 18 | 3 | 2 | 2 | 2 |

EXAMPLE 67

200 g of the food additive slurry composition prepared by Example 3, 2.4 Kg of a commercially available cow's milk, 150 g of butter, 1.25 kg of defatted milk were added into 5 kg of water and homogenized with stirring. After being sterilized and cooled by a normal method, 200 g of a starter preliminarily prepared were inoculated into the mixture, filled into a 180 cc cup, and fermented at 38° C. for 5 hours to thus obtain a calcium-enriched yogurt.

The sensory test was conducted by 10 men and women and eating impression was evaluated by the following 4-rank criteria and flavor was evaluated by the following 5-rank criteria, the average values of which are shown in Table 6.

Eating Impression

Texture is not only good, but tongue touch feel is good:4
Viscosity is somewhat high or texture is somewhat rough, and tongue touch feel is a little harsh:3
Viscosity is fairly high or texture is fairly rough, and tongue touch feel is fairly harsh:2
Viscosity is too high or water is released, and tongue touch feel is very harsh:1

Flavor

Flavor is good:5
Flavor is slightly concerned about (Incongruity is somewhat felt.):4
Flavor is slightly bad (Unpleasantness is somewhat felt.):3
Flavor is considerably bad (Unpleasantness is considerably felt.):2
Flavor is very bad (Unpleasantness is strongly felt.):1

Examples 68 to 72, Comparative Examples 55 to 60

Calcium-enriched yogurts were obtained in the same manner as in Example 67, except that the food additive slurry compositions or the re-dispersed suspensions of the food additive powder compositions prepared by Examples 6, 7, 14, 17, 18, Comparative Examples 2, 3, 7, 11, 12, 16 used and that each calcium agent concentration was adjusted to the same concentration as in Example 67. The sensory test was performed in the same manner as in Example 67. The results are shown in Table 6.

TABLE 6

| | Calcium agent slurry comp. or re-dispersed suspension of powder comp. | Eating impression | Flavor |
|---|---|---|---|
| Example 67 | Product of Example 3 | 4 | 5 |
| Example 68 | Product of Example 6 | 3 | 5 |
| Example 69 | Product of Example 7 | 4 | 4 |
| Example 70 | Product of Example 14 | 4 | 5 |
| Example 71 | Product of Example 17 | 3 | 5 |
| Example 72 | Product of Example 18 | 4 | 4 |
| Comp. Ex. 55 | Product of Comp. Ex. 2 | 3 | 3 |
| Comp. Ex. 56 | Product of Comp. Ex. 3 | 1 | 1 |
| Comp. Ex. 57 | Product of Comp. Ex. 7 | 4 | 5 |
| Comp. Ex. 58 | Product of Comp. Ex. 11 | 3 | 3 |
| Comp. Ex. 59 | Product of Comp. Ex. 12 | 1 | 1 |
| Comp. Ex. 60 | Product of Comp. Ex. 16 | 4 | 5 |

EXAMPLE 73

20 Kg of drink water containing 626 g of the food additive slurry composition prepared by Example 1 were added with stirring to 50 Kg of flour. The stirred materials were aged, stretched thinly by rolls, cut to thus prepare raw noodles. The raw noodles were steamed for a predetermined time and dried to thereby obtain calcium-enriched instant noodles containing a theoretical calcium content of 2.00 mg/g. 10 g of a sample was taken precisely from optional ten spots of the obtained calcium-enriched instant noodles and the calcium content in the instant noodles was measured. The maximum values, the minimum values and the average values are shown in Table 7. The calcium-enriched instant noodles were subjected to sensory test for eating impression by 10 men and women and the results are shown by the following 4-rank evaluation, the average values of which are shown in Table 7.

Eating Impression
Texture is not only good, but tongue touch feel is good:4
Incongruity is rarely felt, but tongue touch feel is somewhat harsh:3
Incongruity is considerably felt and tongue touch feel is considerably harsh:2
Incongruity is noticeably felt and tongue touch feel is noticeably harsh:1

EXAMPLES 74 TO 80, EXAMPLES 84 TO 91

Comparative Examples 61 to 67 Comparative Examples 70 to 76

Calcium-enriched instant noodles were obtained in the same manner as in Example 73, except that the food additive slurry compositions or the re-dispersed suspensions of the food additive powder compositions prepared by Examples 2 to 8, 12 to 19, Comparative Examples 1 to 7, 10 to 16 were used and that each calcium agent concentration was adjusted to the same concentration as in Example 73. The measurement of the calcium content in the calcium-enriched instant noodles and the sensory test for eating impression were performed in the same manner as in Example 73. The results are shown in Table 7.

EXAMPLE 81

20 Kg of drink water containing 1588 g of the food additive slurry composition prepared by Example 9 were added with stirring to 50 Kg of flour. The stirred and homogenized materials were aged, stretched thinly by rolls, cut to thus prepare raw noodles. The raw noodles were steamed for a predetermined time and dried to thereby obtain calcium and magnesium-enriched instant noodles containing a theoretical calcium content of 2.00 mg/g and a theoretical magnesium content of 1.14 mg/g.

The measurement of calcium and magnesium contents in the calcium and magnesium-enriched instant noodles and the sensory test for eating impression were performed in the same manner as in Example 73. The results are shown in Tables 7 and 8.

EXAMPLES 82, 83, 92 TO 94

Comparative Examples 68, 69, 77, 78

The calcium and magnesium-enriched instant noodles were obtained in the same manner as in Example 81, except that the food additive slurry compositions or the re-dispersed suspensions of the food additive powder compositions prepared by Examples 10, 11, 20 to 22 and Comparative Examples 8, 9, 17, 18 were used and that each magnesium concentration was adjusted to the same concentration as in Example 81. The measurement of the calcium and magnesium contents and the sensory test for eating impression were performed in the some manner as in Example 73. The results are shown in Tables 7 and 8.

As is apparent from Tables 1 to 8, the food additive slurry or powder compositions represented by Examples 1 to 22 are possible to be highly concentrated to, for example, 40% by weight, and thus excellent in circulation economy, and excellent in re-dispersibility and dispersion stability in liquid for a long period of time as well as in flavor.

In contrast, the food additive slurry or powder compositions represented by Comparative Examples 1 to 18 are difficult to enhance the concentration to more than 20% by weight and thus are inferior in circulation economy. Especially, those obtained by Comparative Examples 6, 7, 15 and 16 are excellent in stability in liquid as well as flavor, but difficult to be highly concentrated. Moreover, the other food additive slurry or powder compositions represented by other Comparative Examples are comparatively good in stability in liquid, but inferior in flavor in cow's milk.

TABLE 7

| | Calcium agent and/or dolomite slurry comp. or re-dispersed suspension of powder comp. | Ca content in 1 g of noodles (mg) | | | Eating impression |
|---|---|---|---|---|---|
| | | Minimum values | Maximum values | Average values | |
| Example 73 | Product of Example 1 | 1.88 | 2.15 | 1.95 | 4 |
| Example 74 | Product of Example 2 | 1.79 | 2.28 | 1.90 | 3 |

TABLE 7-continued

|  | Calcium agent and/or dolomite slurry comp. or re-dispersed suspension of powder comp. | Ca content in 1 g of noodles (mg) | | | Eating impression |
|---|---|---|---|---|---|
|  |  | Minimum values | Maximum values | Average values |  |
| Example 75 | Product of Example 3 | 1.90 | 2.10 | 1.97 | 4 |
| Example 76 | Product of Example 4 | 1.85 | 2.10 | 1.94 | 3 |
| Example 77 | Product of Example 5 | 1.99 | 2.01 | 2.00 | 4 |
| Example 78 | Product of Example 6 | 1.97 | 2.03 | 1.99 | 4 |
| Example 79 | Product of Example 7 | 1.98 | 2.03 | 1.99 | 3 |
| Example 80 | Product of Example 8 | 1.98 | 2.04 | 2.01 | 4 |
| Example 81 | Product of Example 9 | 1.92 | 2.10 | 1.96 | 4 |
| Example 82 | Product of Example 10 | 1.83 | 2.31 | 2.10 | 3 |
| Example 83 | Product of Example 11 | 1.97 | 2.02 | 2.00 | 3 |
| Example 84 | Product of Example 12 | 1.90 | 2.05 | 1.97 | 4 |
| Example 85 | Product of Example 13 | 1.83 | 2.16 | 1.94 | 3 |
| Example 86 | Product of Example 14 | 1.94 | 2.05 | 1.98 | 4 |
| Example 87 | Product of Example 15 | 1.92 | 1.99 | 1.98 | 3 |
| Example 88 | Product of Example 16 | 1.99 | 2.00 | 2.00 | 4 |
| Example 89 | Product of Example 17 | 1.97 | 1.99 | 1.99 | 4 |
| Example 90 | Product of Example 18 | 1.98 | 2.01 | 1.99 | 3 |
| Example 91 | Product of Example 19 | 1.98 | 2.04 | 2.01 | 4 |
| Example 92 | Product of Example 20 | 1.90 | 2.06 | 1.98 | 4 |
| Example 93 | Product of Example 21 | 1.85 | 2.22 | 1.95 | 3 |
| Example 94 | Product of Example 22 | 1.98 | 2.00 | 1.99 | 3 |
| Comp. Ex. 61 | Product of Comp. Ex. 1 | 0.52 | 3.19 | 1.61 | 1 |
| Comp. Ex. 62 | Product of Comp. Ex. 2 | 1.70 | 2.25 | 1.90 | 2 |
| Comp. Ex. 63 | Product of Comp. Ex. 3 | 0.30 | 2.58 | 1.51 | 1 |
| Comp. Ex. 64 | Product of Comp. Ex. 4 | 1.81 | 2.09 | 1.92 | 2 |
| Comp. Ex. 65 | Product of Comp. Ex. 5 | 1.71 | 2.49 | 1.88 | 2 |
| Comp. Ex. 66 | Product of Comp. Ex. 6 | 1.91 | 2.11 | 1.96 | 4 |
| Comp. Ex. 67 | Product of Comp. Ex. 7 | 1.94 | 2.08 | 1.99 | 4 |
| Comp. Ex. 68 | Product of Comp. Ex. 8 | 1.21 | 2.09 | 1.55 | 1 |
| Comp. Ex. 69 | Product of Comp. Ex. 9 | 1.92 | 2.11 | 1.97 | 2 |
| Comp. Ex. 70 | Product of Comp. Ex. 10 | 0.22 | 5.23 | 3.11 | 1 |
| Comp. Ex. 71 | Product of Comp. Ex. 11 | 1.88 | 2.29 | 2.01 | 2 |
| Comp. Ex. 72 | Product of Comp. Ex. 12 | 0.82 | 3.52 | 2.22 | 1 |
| Comp. Ex. 73 | Product of Comp. Ex. 13 | 1.89 | 2.03 | 1.98 | 2 |
| Comp. Ex. 74 | Product of Comp. Ex. 14 | 1.72 | 2.15 | 1.83 | 2 |
| Comp. Ex. 75 | Product of Comp. Ex. 15 | 1.94 | 2.00 | 1.97 | 4 |
| Comp. Ex. 76 | Product of Comp. Ex. 16 | 1.95 | 2.02 | 1.98 | 4 |
| Comp. Ex. 77 | Product of Comp. Ex. 17 | 0.34 | 3.11 | 1.89 | 1 |
| Comp. Ex. 78 | Product of Comp. Ex. 18 | 1.74 | 2.10 | 2.04 | 2 |

TABLE 8

|  | Calcium agent and/or dolomite slurry comp. or re-dispersed suspension of powder comp. | Mg content in 1 g of noodles (mg) | | |
|---|---|---|---|---|
|  |  | Minimum values | Maximum values | Average values |
| Example 81 | Product of Example 9 | 1.10 | 1.20 | 1.12 |
| Example 82 | Product of Example 10 | 1.05 | 1.32 | 1.20 |
| Example 83 | Product of Example 11 | 1.13 | 1.15 | 1.14 |
| Example 92 | Product of Example 20 | 1.09 | 1.18 | 1.13 |
| Example 93 | Product of Example 21 | 1.06 | 1.27 | 1.11 |
| Example 94 | Product of Example 22 | 1.13 | 1.14 | 1.14 |
| Comp. Ex. 68 | Product of Comp. Ex. 8 | 0.69 | 1.19 | 0.89 |
| Comp. Ex. 69 | Product of Comp. Ex. 9 | 1.10 | 1.21 | 1.13 |
| Comp. Ex. 77 | Product of Comp. Ex. 17 | 0.19 | 1.78 | 1.08 |
| Comp. Ex. 78 | Product of Comp. Ex. 18 | 0.99 | 1.20 | 1.17 |

INDUSTRIAL APPLICABILITY

As explained above, the food additive slurry or powder compositions of the present invention are superior not only in re-dispersibility in liquid, dispersion stability in liquid for a long period of time and flavor, but are capable of providing highly concentrated products, for example, concentrations more than 20% by weight, preferably, more than 25% by weight, more preferably, more than 30% by weight, and therefore they are advantageous economically. Moreover, food compositions prepared by the use of the food additive slurry or powder compositions are very excellent in storage stability for a long period of time even in neutral or acidic region. Further, the present invention has an advantage that the materials used in the present invention can be obtained stably without being influenced by weather, world situation or the like.

The invention claimed is:

1. A food additive slurry composition, comprising: 100 parts by weight of at least one member selected from the group consisting of calcium carbonate, calcium phosphate and dolomite (A); and 0.5 to 60 parts by weight of arabinogalactan (B).

2. A food additive slurry composition, comprising: 100 parts by weight of at least one member selected from the group consisting of calcium carbonate, calcium phosphate, and dolomite (A); and 0.1 to 80 parts by weight of a modified starch (C).

3. The food additive slurry composition of claim 2 or claim 5, wherein said modified starch (C) is a processed starch which is subjected to one or more of oxidation, acid treatment, enzyme treatment, esterification, etherification and crosslinking.

4. The food additive slurry composition of claim 2 or claim 5, wherein said modified starch is octenyl succinic acid-esterified starch.

5. A food additive slurry composition, comprising: at least one member selected from the group consisting of calcium carbonate, calcium phosphate, and dolomite (A);

arabinogalactan (B) present in an amount of 0.5 to 60 parts by weight per 100 parts by weight of said at least one member; and a modified starch (C) present in an amount of 0.1 to 80 parts by weight per 100 parts by weight of said at least one member, wherein the total amount of said arabinogalactan (B) and said modified starch (C) is 1 to 100 parts by weight per 100 parts by weight of said at least one member.

6. The food additive slurry composition of any one of claims 1 to 3, satisfying electric conductivity N (mS/cm) of (a):

(a) $0.17 \leq N \leq 4.00$ wherein N is electric conductivity of said food additive slurry composition after it was pulverized and/or dispersed, and then adjusted to a calcium agent solid concentration of 5% by weight.

7. The food additive slurry composition of claim 2 or claim 5, wherein a weight average diameter K (μm) in particle size distribution of said calcium agent and/or said dolomite contained in said food additive slurry composition is $0.04 \leq K \leq 0.8$.

8. A food additive powder composition, comprising: a dried and pulverized food additive slurry composition, said food additive slurry composition is as claimed in any one of claims 1 to 5.

9. A food composition, comprising said food additive powder composition of claim 8.

10. A food composition, comprising said food additive slurry composition of any one of claims 1 to 5.

* * * * *